3,205,269
STABILIZATION OF ETHERS WITH
PHOSPHOROUS COMPOUNDS
Lester Friedman, Whitestone, N.Y., assignor, by mesne
assignments, to Union Carbide Corporation, a corporation of New York
No Drawing. Filed May 10, 1960, Ser. No. 28,020
17 Claims. (Cl. 260—611.5)

The present invention relates to the stabilization of ethers and ether alcohols.

Aliphatic and heterocyclic ethers and ether alcohols are used industrially as humectants, as solvents in the paint and plastics industries, as plasticizers, in the synthesis of plasticizers, to make alkyd and other polyester resins, as elastomers and as components in the manufacture of polyurethanes and epoxy polymers. The low cost of such ethers and ether alcohols has led to their widespread use and acceptance. However, their susceptibility to air oxidation and thermal degradation are serious disadvantages in many applications due to color changes, e.g., yellowing and/or the formation of peroxides, hydroperoxides, aldehydes, ketones and carboxylic acids.

Accordingly, it is an object of the present invention to stabilize aliphatic and cycloaliphatic ethers and ether alcohols against changes due to oxidation and/or thermal degradation.

Another object is to provide a stabilizer for aliphatic ethers and ether alcohols which will impart its stabilizing characteristics to products made from such materials.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by utilizing as the stabilizers tertiary phosphites and thiophosphites. The phosphites and thiophosphites can be aliphatic, including cycloaliphatic, aromatic, heterocyclic or mixtures of such materials.

As the ethers and ether alcohols which can be stabilized there can be mentioned diethyl ether, dibutyl ether, dihexyl ether, dioctadecyl ether, tetrahydropyran, tetrahydrofuran, dihydropyran, tetrahydrofurfuryl alcohol, isosorbide dimethyl ether, 1,3-dioxane, 1,4-dioxane, diethylene glycol, triethylene glycol, tetraethylene glycol, polyethylene glycols having an average molecular weight range of from 162 to 10,000, dipropylene glycol, tripropylene glycol, polypropylene glycols having average molecular weights in the range of 204 to 4,000, monomethyl ether of diethylene glycol, monomethyl ether of triethylene glycol, monomethyl ether of polyethylene glycols having an average molecular weight of 174 to 10,000, monoethyl ether of diethylene glycol, diethylene glycol dimethyl ether, diethylene glycol dibutyl ether, triethylene glycol diethyl ether, tetraethylene glycol dibutyl ether, polyethylene glycol having an average molecular weight of 162 to 10,000, diethyl ether, adducts of a polyhydric alcohol having 2 to 6 hydroxyl groups with an alkylene oxide, LG-56 (glycerol propylene oxide adduct having a molecular weight of 3000, i.e., a polypropylene ether triol), LG-68 (glycerol-propylene oxide adduct having a molecular weight of 1000), LH-T triols 42, 67, 112 and 240 (triols prepared from 1,2,6-hexanetriol and propylene oxide in the molecular weight ranges of 4000, 2400, 1500 and 750, respectively), pluronics (an adduct of equal mols of propylene oxide and ethylene oxide having a molecular weight of 1000 to 1200) and tetronic (an adduct of equal mols of 1,2-butylene oxide and ethylene oxide having a molecular weight of 1000 to 1200), methyl phenyl ether, etc. Adducts of ethylene oxide or butylene oxide with sorbitol or glycerol also can be stabilized.

As the stabilizers there can be employed alkyl, aryl, alkoxyaryl and heterocyclic phosphites and thiophosphites of the formula

(I)

where R', R" and R''' are alkyl, cycloalkyl, aryl, alkoxyalkyl, aralkyl or tetrahydrofurfuryl and X is oxygen or sulfur.

Typical examples of such phosphites and thiophosphites are trimethyl phosphite, trimethyl thiophosphite, triethyl phosphite, triethyl trithiophosphite, tributyl phosphite, triisobutyl phosphite, tri secondary butyl phosphite, tri tertiary butyl phosphite, tributyl trithiophosphite, tributyl dithiophosphite, tributyl monothiophosphite, trihexyl phosphite, trihexyl trithiophosphite, tricyclohexyl phosphite, tricyclohexyl trithiophosphite, tri-2-ethylhexyl phosphite, tri-2-ethylhexyl trithiophosphite, triisooctyl phosphite, tridecyl phosphite, tridecyl dithiophosphite, trilauryl phosphite, trilauryl trithiophosphite, trilauryl dithiophosphite, trilauryl monothiophosphite, trioctadecyl phosphite, trioctadecyl trithiophosphite, trieicosanyl phosphite, phenyl didecyl phosphite, phenyl didecyl trithiophosphite, phenyl dilauryl phosphite, phenyl distearyl phosphite, phenyl distearyl trithiophosphite, diphenyl decyl phosphite, diphenyl lauryl phosphite, diphenyl stearyl phosphite, diphenyl stearyl trithiophosphite, triphenyl phosphite, triphenyl trithiophosphite, triphenyl dithiophosphite, triphenyl monothiophosphite, tri p-cresyl phosphite, tri m-cresyl phosphite, tri o-cresyl phosphite, tri p-cresyl dithiophosphite, tri p-octyl phenyl trithiophosphite, tri p-octylphenyl phosphite, triethoxyethyl phosphite, tributoxyethyl phosphite, tritetrahydrofurfuryl phosphite, tritetrahydrofurfuryl trithiophosphite, triphenyl ethyl phosphite, S - phenyldilauryl monothiophosphite, S - phenyldidecyl monothiophosphite, S,S-diphenyl lauryl dithiophosphite, S,S-diphenyldecyl dithiophosphite, tri α-naphthyl phosphite, tri β-naphthyl phosphite, S,S-diphenyldecyl dithiophosphite, phenyldilauryl trithiophosphite, tri p-dodecylphenyl phosphite, tri o-chlorophenyl phosphite, tri m-chlorophenyl phosphite, diphenyl lauryl trithiophosphite, S-lauryldiphenyl monothiophosphite, tri p-chlorophenyl phosphite, tri p-chlorophenyl trithiophosphite, tri p-methoxyphenyl phosphite, S,O-diphenyl-S-lauryl dithiophosphite, tri o-methoxyphenyl dithiophosphite, S,S-dilauryl phenyl dithiophosphite, and S,O-dilauryl-S-phenyl dithiophosphite.

The preferred phosphite esters as stabilizing materials according to the invention, however, are cyclic phosphites or pentaerythritol derivatives of one of the following formulae

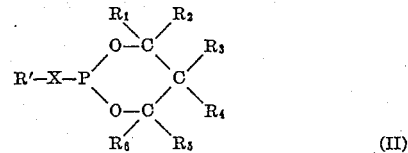
(II)

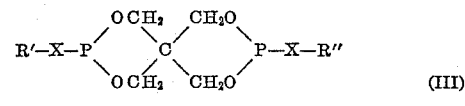
(III)

 (IV)

where R' and R" are as defined above and can be methyl, ethyl, propyl, butyl, isobutyl, secondary butyl, tertiary butyl, amyl, hexyl, heptyl, octyl, isooctyl, 2-ethylhexyl, decyl, isodecyl, lauryl, tetradecyl, cetyl, octadecyl (stearyl), eicosanyl, ethoxyethyl, butoxyethyl, methoxyethyl, tetrahydrofurfuryl, phenylethyl, aryl or haloaryl, e.g., phenyl, o-tolyl (o-cresyl), m-tolyl, p-tolyl, o-ethylphenyl, p-ethylphenyl, p-t-butylphenyl, o-t-butylphenyl, m-t-butylphenyl, p-octylphenyl, p-nonylphenyl, p-decylphenyl, p-dodecylphenyl, benzylphenyl, o-phenylphenyl, p - phenylphenyl, o - chlorophenyl, m-chlorophenyl, p-chlorophenyl, o-bromophenyl, p-fluorophenyl, m-iodophenyl, o-methoxyphenyl, p-methoxyphenyl, m-methoxyphenyl, α-naphthyl and β-naphthyl. In the formulae $R_1$, $R_2$, $R_3$, $R_4$, $R_5$ and $R_6$ are hydrogen or alkyl groups of 1 to 20 carbon atoms, e.g., methyl, ethyl, propyl, isopropyl, butyl, secondary butyl, tertiary butyl, amyl, hexyl, decyl, dodecyl and eicosanyl and X is oxygen or sulfur.

The dioxaphospholanes do not perform satisfactorily as stabilizers according to the invention.

As the cyclic phosphites and/or the pentaerythritol phosphite which can be used in the present invention there may be mentioned all of the dioxaphosphorinanes disclosed in Hechenbleikner et al. Patent 2,834,798, e.g., on column 2, line 55 to column 3, line 31, and in Examples 8–11 and 60–100 and in McManimie Patent 2,893,961, as well as the pentaerythritol phosphites disclosed in Hechenbleikner Patent 2,847,443, column 2, line 40, to column 5, line 8 and Examples 1 to 4. The cyclic compounds can be prepared as shown in the Hechenbleikner and McManimie patents.

The present invention is not limited, however, to the use of the phosphites disclosed in the Hechenbleikner et al. and McManimie patents but instead embraces all of the phosphites and thiophosphites coming within Formulae I to IV supra. Typical examples of stabilizers coming within Formulae II to IV which can be employed are 2-phenoxy-1,3,2-dioxaphosphorinane (phenyl trimethylene phosphite),
2-cyclohexyloxy-1,3,2-dioxaphosphorinane,
2-methoxy-1,3,2-dioxaphosphorinane,
2-ethoxy-1,3,2-dioxaphosphorinane,
2-secondary butoxy-1,3,2-dioxaphosphorinane,
2-isopropoxy-1,3,2-dioxaphosphorinane,
2-amyloxy-1,3,2-dioxaphosphorinane,
2-octyloxy-1,3,2-dioxaphosphorinane,
2-decyloxy-1,3,2-dioxaphosphorinane,
2-octadecyloxy-1,3,2-dioxaphosphorinane,
2-decyloxy-5,5-dimethyl-1,3,2-dioxaphosphorinane,
2-decyloxy-5-ethyl-5-methyl-1,3,2-dioxaphosphorinane,
2-decyloxy-5,5-diethyl-1,3,2-dioxaphosphorinane,
2-decyloxy-4,4,6-trimethyl-1,3,2-dioxaphosphorinane,
2-octadecyloxy-5,5-dimethyl-1,3,2-dioxaphosphorinane,
2-methoxy-5,5-dimethyl-1,3,2-dioxaphosphorinane,
2-phenoxy-4-methyl-1,3,2-dioxaphosphorinane,
2-phenoxy-5,5-dimethyl-1,3,2-dioxaphosphorinane,
2-phenoxy-4,4,6-trimethyl-1,3,2-dioxaphosphorinane,
2-octadecyloxy-4,4,6-trimethyl-1,3,2-dioxaphosphorinane,
2-phenoxy-4-propyl-5-ethyl-1,3,2-dioxaphosphorinane,
2-phenoxy-4,6-dimethyl-1,3,2-dioxaphosphorinane,
2-phenoxy-4-ethyl-5-methyl-1,3,2-dioxaphosphorinane,
2-phenoxy-5,5-diethyl-1,3,2-dioxaphosphorinane,
2-phenoxy-4-propyl-1,3,2-dioxaphosphorinane,
2-(2-chloro)phenoxy-4,4,6-trimethyl-1,3,2-dioxaphosphorinane,
2-(4-octyl)phenoxy-4,4,6-trimethyl-1,3,2-dioxaphosphorinane,
2-(2-methyl)phenoxy-1,3,2-dioxaphosphorinane,
3,9-diphenoxy-2,4,8,10-tetraoxa-3,9-diphosphaspiro[5,5]undecane(diphenylpentaerythritol diphosphite),
3,9-didecyloxy-2,4,8,10-tetraoxa-3,9-diphosphaspiro[5,5]undecane(didecyl pentaerythritol diphosphite),
3,9-dioctadecyloxy-2,4,8,10-tetraoxa-3,9-diphosphaspiro[5,5]undecane(distearyl pentaerythritol diphosphite),
3-decyloxy-9-phenyloxy-2,4,8,10-tetraoxa-3,9-diphosphaspiro[5,5]undecane(phenyl decyl pentaerythritol diphosphite),
3-octadecyloxy-9-phenyloxy-2,4,8,10-tetraoxa-3,9-diphosphaspiro[5,5]undecane,
3,9-dimethoxy-2,4,8,10-tetraoxa-3,9-diphosphaspiro[5,5]undecane,
3,9-di p-tolyloxy-2,4,8,10-tetraoxa-3,9-diphosphaspiro[5,5]undecane,
3,9-di o-chlorophenoxy-2,4,8,10-tetraoxa-3,9-diphosphaspiro[5,5]undecane,
2-phenylethoxy-1,3,2-dioxaphosphorinane,
2-benzyloxy-1,3,2-dioxaphosphorinane,
3,9-dibenzyloxy-2,4,8,10-tetraoxa-3,9-diphosphaspiro[5,5]undecane,
3,9-dicyclohexyloxy-2,4,8,10-tetraoxa-3,9-diphosphaspiro[5,5]undecane,
octamethyl pentaerythritol tetraphosphite $$([(CH_3O)_2-P-OCH_2]_4C),$$

octabutyl pentaerythritol tetraphosphite,
octaoctadecyl pentaerythritol tetraphosphite,
octaphenyl pentaerythritol tetraphosphite,

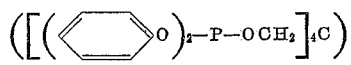

octatolyl pentaerythritol tetraphosphite,
tetraphenyl tetrabutyl pentaerythritol tetraphosphite,
2-dodecylthio-5,5-dimethyl-1,3,2-dioxaphosphorinane,
2-phenylthio-5,5-dimethyl-1,3,2-dioxaphosphorinane,
2-dodecylthio-1,3,2-dioxaphosphorinane,
2-phenylthio-1,3,2-dioxaphosphorinane,
3-phenylthio-9-decyloxy-2,4,8,10-tetraoxa-3,9-diphosphaspiro[5,5]undecane,
3-phenylthio-9-dodecylthio-2,4,8,10-tetraoxa-3,9-diphosphaspiro[5,5]undecane,
3,9-di(phenylthio)-2,4,8,10-tetraoxa,3,9-diphosphaspiro[5,5]undecane,
3-dodecylthio-9-phenyloxy-2,4,8,10-tetraoxa-3,9-diphosphaspiro[5,5]undecane,
3,9-bis-(dodecylthio)-2,4,8,10-tetraoxa-3,9-diphosphaspiro[5,5]undecane,
3-dodecylthio-9-decyloxy-2,4,8,10-tetraoxa-3,9-diphosphaspiro[5,5]undecane,
octalauryl pentaerythritol tetrathiophosphite $$([C_{12}H_{25}S)_2-P-OCH_2]_4C)$$

octaphenyl pentaerythritol tetrathiophosphite, tetramethyl tetraphenyl pentaerythritol tetrathiophosphite.

Preferably the alkyl group in the alkyl phosphites and thiophosphites has at least 6 carbon atoms since this reduces the volatility of the stabilizer.

While all of the foregoing examples of phosphite and thiophosphite esters are effective in stabilizing ethers and ether alcohols against air oxidation and degradation, several classes within the group are preeminently effective. These preferred esters are the 1,3,2-dioxaphosphorinanes and the 2,4,8,10-tetraoxa-3,9-diphosphaspiro[5,5]undecanes and their common characteristics are (1) they are cyclic esters of phosphorous acid and (2) there are six atoms including phosphorus in the ring.

In those cases where the thiophosphites are new compounds they can be formed in the same manner as the phosphites by replacing the appropriate alcohol by the corresponding mercaptan.

There is frequently a synergistic effect when other stabilizers or antioxidants are used in conjunction with the phosphite or thiophosphite esters. Examples of such conjunctive antioxidants are the phenols, e.g., 2-t-butyl-m-cresol, o-t-butylphenol, 2,6-di-t-butylphenol, 2,6-diethylphenol, 2,6-di-t-butyl-m-cresol, 2,2'-methylene bis-(4-methyl-6-t-butylphenol), 2,2'-thiobis-(4-methyl-6-t-butylphenol), 2,4,6-tri-t-butylphenol, t-butylhydroquinone, 2,5-di-t-butylhydroquinone, 2,2-bis-(p-hydroxyphenyl) propane, o-octylphenol. In the absence of the phosphite or thiophosphite these phenolic antioxidants are essentially ineffective and have little or no value in polyether systems or the like.

While not being limited to any particular theory, it is believed that polyester systems undergo oxidation and degradation by a free radical process involving oxygen (from the air), the hydrogen and carbon atoms adjacent to the ether linkage, and possibly metal catalysts which may be present as impurities. Free radical reactions are usually chain processes and therefore autocatalytic. Thus, oxidation, once initiated, proceeds with increasing vigor. Analysis of a polyether during eexposure to the atmosphere demonstrates the presence of active oxygen as peroxides and/or hydroperoxides, carbonyl groups as aldehydes and ketones and an increase in acidity, as a result of carboxylic acid formation. At elevated temperatures, e.g., 120–285° F., the rate of oxidation and concomitant degradation increases markedly. In the absence of air or oxygen, no oxidation or degradation ensue. If small amounts of tertiary phosphites and/or thiophosphites are employed as stabilizers, polyethers and other ethers and ether alcohols do not undergo oxidation or degradation at room or elevated temperatures after exposure to the atmosphere for extended periods of time. Twenty-four hours of such exposure does not result in measurable quantities of degradation or oxidation products. Untreated material after such exposure is extensively oxidized.

The tertiary phosphites and/or thiophosphites are employed in an amount to provide 0.05 to 0.5% of phosphorus based on the weight of the material to be stabilized. In commercial practice levels of 0.1 to 0.5% of phosphorus are adequate. Higher amounts of phosphorus can be used, e.g., 1%, but they are unnecessary and uneconomical. Usually, about 0.5 to 5% by weight of the phosphite or thiophosphite ester is required to provide 0.05 to 0.5% of phosphorus.

Unless otherwise indicated, all parts and percentages are by weight.

*Example 1*

1000 grams of polypropylene glycol 2025 (a polypropylene glycol of molecular weight about 2000 prepared by the base catalyzed polymerization of propylene oxide) and 25 grams of 3,9-didecyloxy-2,4,8,10-tetraoxa-3,9-diphosphaspiro[5,5]undecane were thoroughly mixed. 100 gram aliquots were then placed in Pyrex crystallizing dishes (80 mm. diameter), exposed to the atmosphere and maintained respectively for twenty days at (a) room temperature, (b) 100° F., (c) 125° F., (d) 160° F., (e) 200° F., (f) 250° F., and (g) 300° F. Two aliquots (100 grams each) were placed in flasks, purged with nitrogen, sealed and then maintained at room temperature and 300° F., respectively for twenty days. Unstabilized polypropylene glycol 2025 was maintained under identical conditions for use as controls. At the end of the test period of twenty days, the various aliquots were tested for the presence of the following functional groups: carboxyl groups, peroxides, carboxylic acids and unsaturation using the procedures described in Siggia, "Quantitative Organic Analysis via Functional Groups," Second Edition, John Wiley & Sons, 1954. The stabilized material was peroxide free and the analyses for carbonyl groups, carboxylic acids and unsaturation failed to disclose detectable amounts over the entire range from room temperature to 300° F. In fact, tertiary phosphite ester was still present since the polypropylene glycol still possessed reducing properties, e.g., a solution of iodine in acetic acid and water was reduced to iodide ion. On the other hand, all of the controls, with the exception of the two samples that were maintained in a nitrogen atmosphere, were found to contain peroxides, aldehydes, ketones and free carboxylic acids. The degree of oxidative attack was proportional to the ambient temperature of the control sample. The samples that were maintained in a nitrogen atmosphere underwent no degradation.

From the above it is evident that polypropylene glycol does not undergo oxidative degradation or thermal oxidation when maintained in an oxygen-free atmosphere over the temperature range of 60° F. to 300° F. but does undergo extensive degradation in the presence of air or oxygen. Tertiary phosphite ester stabilized polypropylene glycol is resistant to oxidative degradation.

In the above example 2.5% by weight of phosphite ester based on the polypropylene glycol was employed. The phosphite ester contained 12.2% phosphorus. Hence, the amount of phosphorus employed was 0.305% based on the weight of the polypropylene glycol.

*Example 2*

1000 grams of diethylene glycol and 30 grams of tridecyl phosphite were mixed together and allowed to remain at room temperature exposed to the air for seven days. Phosphite-free diethylene glycol was used as the control. At the end of the test period analytic examination of the stabilized material did not disclose the presence of peroxides or degraded material. The control gave positive tests for peroxides, aldehydes, ketones and carboxylic acids.

*Example 3*

500 grams of Triol LG–56 (a triol prepared from glycerol and propylene oxide and having a molecular weight of 3000) and 15 grams of 3,9-bis (dodecylthio)-2,4,8,10-tetraoxa-3,9-diphosphaspiro [5,5]-undecane were combined and heated with exposure to the atmosphere for six hours at 275° F. There was no evidence of degradation or oxidation. A control similarly treated gave positive tests for peroxides, aldehydes, ketones and carboxylic acids and in addition assumed a deep yellow color.

*Example 4*

500 grams of diethylene glycol dibutyl ether (dibutyl Carbitol) and 10 grams of 3,9-didecyloxy-2,4,8,10-tetraoxa-3,9-diphosphaspiro [5,5] undecane were exposed to the atmosphere for ten days at room temperature. The presence of peroxides could not be detected. A control sample contained almost 2% free peroxide after the ten day period.

*Example 5*

100 grams of Triol LG–56 stabilized with 3 grams of 3,9-bis (dodecylthio) - 2,4,8,10 - tetraoxa-3,9-diphosphaspiro [5,5] undecane after exposure to the atmosphere at 275° F. for six hours were treated with 0.8 gram of a dimethyl siloxane oil (Silicone Oil XL–520 of Union Carbide Chemicals Co.), 0.2 gram dibutyl tin dilaurate, 0.13 gram N,N,N',N'-tetramethyl-1,3-butanediamine, 0.2 gram N-methylmorpholine, 39.2 grams toluene diisocyanate (80/20 ratio of 2,4 to 2,6 isomer), and 2.9 ml. of water to give a "one shot" urethane foam. The foam was cured at 250° F. for 15 minutes and then for 16 hours at 285° F. The cured foam had a density of 2.1 lb./cu. ft., tensile strength of 18 to 20 p.s.i., and an elongation of greater than 300%. This, Triol LG–56, even after exposure to oxidative influences at elevated temperatures in the presence of a tertiary phosphite stabilizer, was sufficiently unaltered to foam a urethane foam with excellent characteristics using a standard recipe. (Bulletin F–40519, June 1959, Union Carbide Chemicals Co.) The foam remained stable during the curing operation. LG–56 Triol which had been exposed for six hours to a temperature of 275° F. in the absence of the phosphite stabilizer and then used in the standard recipe also gave a foam. However, this foam collapsed during the curing operation.

In addition to compatibility with isocyanates and urethane polymer systems, tertiary phosphite and thiophosphite stabilized polyether diols and triols are compatible in epoxy polymer systems. Laminates and shallow castings were obtained from Triol LG–56 containing 3% by weight of tridecyl phosphite and dicyclopentadiene diepoxide, for example.

The terms "tertiary phosphite" and "tertiary thiophosphite" in the specification and claims are used in their normal sense to mean a phosphite in which all three valences of the phosphorus atoms are satisfied by a chalcogen atom which, in turn, is directly attached to a carbon atom. The terms "a tertiary hydrocarbon phosphite" and "a tertiary hydrocarbon thiophosphite free of nonbenzenoid unsaturation" are intended to cover those members of the above class of phosphites and thiophosphites which are alkyl, aryl, aralkyl, or cycloalkyl phosphites or thiophosphites.

What is claimed is:

1. An ether of the group consisting of (1) polyalkylene glycols having a molecular weight up to 10,000 wherein the alkylene groups have 2 to 4 carbon atoms, (2) mono and dialkyl ethers of polyethylene glycol having molecular weights up to 10,000 wherein the alkyl groups have 1 to 4 carbon atoms, and (3) adducts of an unsubstituted saturated aliphatic polyhydric alcohol having 3 to 6 hydroxyl groups and 3 to 6 carbon atoms with a 2 to 4 carbon atom alkylene oxide having a molecular weight up to 4000 stabilized with a phosphorus compound of the group consisting of the compounds having the formulae

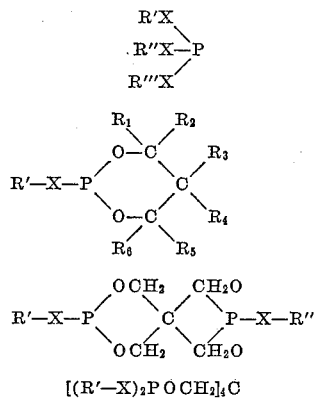

where R', R" and R'" are selected from the group consisting of 1 to 20 carbon atom alkyl, cyclohexyl, phenyl, lower alkylphenyl, benzyl, X is a chalcogen of atomic weight 16 to 32 and $R_1$, $R_2$, $R_3$, $R_4$, $R_5$ and $R_6$ are selected from the group consisting of hydrogen and lower alkyl, said phosphorus compound being present in an amount to provide 0.05 to 0.5% phosphorus based on the weight of the ether.

2. A polyalkylene glycol having a molecular weight up to 10,000 and wherein the alkylene groups have 2 to 4 carbon atoms stabilized with a phosphorus compound of the group consisting of compounds having the formulae

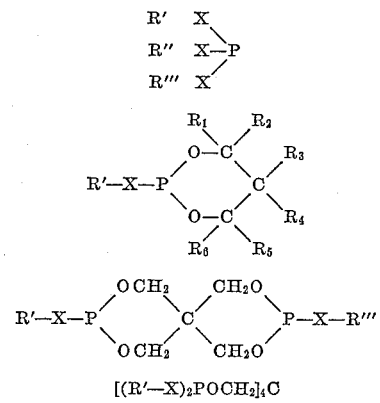

where R', R" and R'" are selected from the group consisting of 1 to 20 carbon atom alkyl, cyclohexyl, phenyl, lower alkylphenyl, benzyl, X is a chalcogen of atomic weight 16 to 32 and $R_1$, $R_2$, $R_3$, $R_4$, $R_5$ and $R_6$ are selected from the group consisting of hydrogen and lower alkyl, said phosphorus compound being present in an amount to provide 0.05 to 0.5% phosphorus base on the weight of the polyalkylene glycol.

3. A composition according to claim 2 wherein the polyalkylene glycol is polyethylene glycol.

4. A composition according to claim 2 wherein the polyalkylene glycol is polypropylene glycol having a molecular weight up to 4000.

5. An adduct of an unsubstituted saturated aliphatic polyhydric alcohol having 3 to 6 hydroxyl groups and 3 to 6 carbon atoms with an alkylene oxide having 2 to 4 carbon atoms, said adduct having a molecular weight up to 4000 stabilized with a phosphorus compound of the group consisting of compounds having the formulae

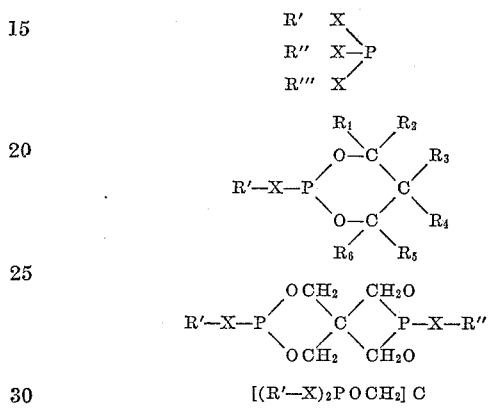

where R', R" and R'" are selected from the group consisting of 1 to 20 carbon atom alkyl, cyclohexyl, phenyl, lower alkylphenyl, benzyl, X is a chalcogen of atomic weight 16 to 32 and $R_1$, $R_2$, $R_3$, $R_4$, $R_5$ and $R_6$ are selected from the group consisting of hydrogen and lower alkyl, said phosphorus compound being present in an amount to provide 0.05 to 0.5% phosphorus based on the weight of the adduct.

6. An ether of the group consisting of (1) polyalkylene glycols having a molecular weight up to 10,000 wherein the alkylene groups have 2 to 4 carbon atoms, (2) mono and dialkyl ethers of polyethylene glycol having molecular weights up to 10,000 wherein the alkyl groups have 1 to 4 carbon atoms, and (3) adducts of an unsubstituted saturated aliphatic polyhydric alcohol having 3 to 6 hydroxyl groups and 3 to 6 carbon atoms with an alkylene oxide having 2 to 4 carbon atoms, said adduct having a molecular weight up to 4000 stabilized with a tertiary hydrocarbon phosphite wherein the hydrocarbon groups are selected from the group consisting of 8 to 18 carbon atom alkyl groups, phenyl and lower alkylphenyl and the phosphite is used in an amount to provide 0.05 to 0.5% phosphorus based on the weight of the ether.

7. A composition according to claim 6 wherein the ether is polyalkylene glycol.

8. A composition according to claim 7 wherein the phosphite is a trialkyl phosphite having 8 to 18 carbon atoms in the alkyl group.

9. An ether of the group consisting of (1) polyalkylene glycols having a molecular weight up to 10,000 wherein the alkylene groups have 2 to 4 carbon atoms, (2) mono and dialkyl ethers of polyethylene glycol having molecular weights up to 10,000 wherein the alkyl groups have 1 to 4 carbon atoms, and (3) adducts of an unsubstituted saturated aliphatic polyhydric alcohol having 3 to 6 hydroxyl groups and 3 to 6 carbon atoms with an alkylene oxide having 2 to 4 carbon atoms, said adduct having a molecular weight up to 4000 stablized with a tertiary hydrocarbon thiophosphite wherein the hydrocarbon groups are selected from the group consisting of 8 to 18 carbon atom alkyl groups, phenyl and lower alkylphenyl and the thiophosphite is used in an amount to provide 0.05 to 0.5% phosphorus based on the weight of the ether.

10. A composition according to claim 9 wherein the ether is a polyalkylene glycol.

11. An ether of the group consisting of (1) polyalkylene glycols having a molecular weight up to 10,000 wherein the alkylene groups have 2 to 4 carbon atoms, (2) mono and dialkyl ethers of polyethylene glycol having molecular weights up to 10,000 wherein the alkyl groups have 1 to 4 carbon atoms, and (3) adducts of an unsubstituted saturated aliphatic polyhydric alcohol having 3 to 6 hydroxyl groups and 3 to 6 carbon atoms with an alkylene oxide having 2 to 4 carbon atoms having a molecular weight up to 4000 stabilized with a 2,4,8,10-tetraoxa-3,9-diphosphaspiro [5,5] undecane having the free valences of each of the two phosphorus atoms attached to a chalcogen of atomic weight 16 to 32 which, in turn, is attached to a hydrocarbon group selected from the group consisting of 1 to 20 carbon atom alkyl, phenyl and lower alkylphenyl, the phosphorus containing compound being employed in an amount to provide 0.05 to 0.5% of phosphorus based on the weight of the ether.

12. A polyalkylene glycol having a molecular weight up to 10,000 and having 2 to 4 carbon atoms in the alkyl group stabilized with a 3,9-dihydrocarbonoxy-2,4,8,10-tetraoxa-3,9-diphosphaspiro [5,5] undecane, wherein the hydrocarbon groups are selected from the group consisting of 1 to 20 carbon atom alkyl, phenyl and lower alkylphenyl and wherein the phosphorus compound is employed in an amount to provide 0.05 to 0.5% of phosphorus based on the weight of the polyalkylene glycol.

13. A polyalkylene glycol having a molecular weight up to 10,000 and having 2 to 4 carbon atoms in the alkyl group stabilized with a 3,9-dihydrocarbonthio-2,4,8,10-tetraoxa-3,9-diphosphaspiro [5,5] undecane, wherein the hydrocarbon groups are selected from the group consisting of 1 to 20 carbon atom alkyl, phenyl and lower alkylphenyl and wherein the phosphorus compound is employed in an amount to provide 0.05 to 0.5% of phosphorus based on the weight of the polyalkylene glycol.

14. Polypropylene glycol having a molecular weight up to 4000 stabilized with a trihydrocarbon phosphite wherein the hydrocarbon groups are selected from the group consisting of 8 to 18 carbon atom alkyl, phenyl and lower alkylphenyl and wherein the phosphite is used in an amount to provide 0.05 to 0.5% phosphorus by weight of the polypropylene glycol.

15. Diethylene glycol stabilized with tridecyl phosphite, said phosphite being present in an amount to provide 0.05 to 0.5% phosphorus by weight based on the weight of the diethylene glycol.

16. An adduct of glycerine and propylene oxide having a molecular weight up to 3000 stabilized with 3,9-bis (dodecylthio)-2,4,8,10-tetraoxa - 3,9-diphosphaspiro [5,5] undecane, the amount of said undecane being sufficient to provide 0.05 to 0.5% phosphorus by weight of said adduct.

17. Polypropylene glycol having a molecular weight up to 4000 stabilized with 3,9-didecyloxy-2,4,8,10-tetraoxa-3,9-diphosphaspiro [5,5] undecane, said undecane being present in an amount to provide 0.05 to 0.5% by weight phosphorus based on the weight of the polypropylene glycol.

References Cited by the Examiner

UNITED STATES PATENTS

| | | | |
|---|---|---|---|
| 2,315,544 | 4/43 | Reuter | 260—461.315 |
| 2,321,307 | 6/43 | Mikesha et al. | 260—461.115 XR |
| 2,641,614 | 6/53 | Britton et al. | 260—611.5 XR |
| 2,796,401 | 6/57 | Matuszak et al. | 260—611.5 XR |
| 2,816,876 | 12/57 | Higashi | 260—461.315 XR |
| 2,834,798 | 5/58 | Hechenbleikner et al. | 260—461.315 |
| 2,839,563 | 6/58 | Hechenbleikner et al. | 260—461.315 |
| 2,938,877 | 5/60 | Mack et al. | 260—461.315 XR |
| 2,961,454 | 11/60 | Gould et al. | 260—461.303 |
| 3,074,967 | 1/63 | Brillhart | 260—611.5 XR |

LEON ZITVER, *Primary Examiner.*

CHARLES B. PARKER, *Examiner.*